United States Patent
Watanabe et al.

(10) Patent No.: US 10,626,280 B2
(45) Date of Patent: Apr. 21, 2020

(54) NANO-METAL INK AND PROCESS FOR PRODUCING METAL FILM USING SAME

(71) Applicant: Nagase ChemteX Corporation, Osaka (JP)

(72) Inventors: Koji Watanabe, Hyogo (JP); Hiroaki Ozoe, Hyogo (JP); Yutaka Tsujimura, Hyogo (JP)

(73) Assignee: Nagase Chemtex Corporation, Osaka (JP)

( * ) Notice: Subject to any disclaimer, the term of this patent is extended or adjusted under 35 U.S.C. 154(b) by 102 days.

(21) Appl. No.: 15/576,534

(22) PCT Filed: May 25, 2016

(86) PCT No.: PCT/JP2016/002534
§ 371 (c)(1),
(2) Date: Nov. 22, 2017

(87) PCT Pub. No.: WO2016/189866
PCT Pub. Date: Dec. 1, 2016

(65) Prior Publication Data
US 2018/0148587 A1 May 31, 2018

(30) Foreign Application Priority Data
May 27, 2015 (JP) ................. 2015-107607

(51) Int. Cl.
| | | |
|---|---|---|
| *C09D 11/101* | (2014.01) | |
| *C09D 11/52* | (2014.01) | |
| *C08K 3/08* | (2006.01) | |
| *C08K 5/17* | (2006.01) | |
| *C09D 11/03* | (2014.01) | |
| *C09D 11/102* | (2014.01) | |
| *C09D 163/08* | (2006.01) | |
| *C09D 171/02* | (2006.01) | |
| *H01B 1/00* | (2006.01) | |
| *H01B 13/00* | (2006.01) | |
| *H01B 1/22* | (2006.01) | |
| *C09D 11/037* | (2014.01) | |

(52) U.S. Cl.
CPC .............. *C09D 11/101* (2013.01); *C08K 3/08* (2013.01); *C08K 5/17* (2013.01); *C09D 11/03* (2013.01); *C09D 11/037* (2013.01); *C09D 11/102* (2013.01); *C09D 11/52* (2013.01); *C09D 163/08* (2013.01); *C09D 171/02* (2013.01); *H01B 1/00* (2013.01); *H01B 1/22* (2013.01); *H01B 13/00* (2013.01); *C08K 2201/003* (2013.01); *C08K 2201/011* (2013.01)

(58) Field of Classification Search
None
See application file for complete search history.

(56) References Cited

U.S. PATENT DOCUMENTS

| | | |
|---|---|---|
| 2010/0096002 A1 | 4/2010 | Hayashi et al. |
| 2015/0252224 A1 | 9/2015 | Iseda et al. |
| 2017/0043396 A1* | 2/2017 | Koduma .................. B22F 1/02 |

FOREIGN PATENT DOCUMENTS

| | | | |
|---|---|---|---|
| EP | 3135405 A1 | | 3/2017 |
| JP | 2002-329945 A | | 11/2002 |
| JP | 2006-233034 A | | 9/2006 |
| JP | 2006233034 A | * | 9/2006 |
| JP | 2007-317367 A | | 12/2007 |
| JP | 2009-138242 A | | 6/2009 |
| JP | 2010-080095 A | | 4/2010 |
| JP | 2011-037999 A | | 2/2011 |
| JP | 2013-112807 A | | 6/2013 |

OTHER PUBLICATIONS

JP 2006-233034A, Sep. 2006, Machine Translation.*
International Search Report, PCT/JP2016/002534, dated Aug. 30, 2016, 9 pages.
European Search Report issued in the corresponding European Patent Application No. 16799579.4, dated Apr. 6, 2018, 7 pages.

* cited by examiner

*Primary Examiner* — Satya B Sastri
(74) *Attorney, Agent, or Firm* — Stinson LLP

(57) ABSTRACT

A nanometal ink capable of forming a metal film that exhibits good adhesion to a substrate and has low resistance. The nanometal ink is a baking-type nanometal ink, and contains metal nanoparticles, a polymerizable compound, a polymerization reaction initiator, a volatile liquid medium, and a dispersant. The polymerization reaction initiator is to be activated by the action of heat and/or light, to allow polymerization of the polymerizable compound to proceed. The dispersant includes a $C_{6-14}$ alkylamine.

12 Claims, No Drawings

NANO-METAL INK AND PROCESS FOR PRODUCING METAL FILM USING SAME

REFERENCE TO RELATED APPLICATIONS

This application is a U.S. national stage application of PCT application PCT/JP2016/002534 filed May 25, 2016 and claims priority to Japanese application 2015-107607 filed May 27, 2015, the entire disclosures of which are hereby incorporated by reference.

FIELD OF THE INVENTION

The present invention relates to a baking-type ink including metal nanoparticles dispersed in a liquid medium (i.e., baking-type nanometal ink), and a metal film production method using the same.

BACKGROUND

Electrically conductive pastes containing metal nanoparticles have been used in forming a circuit pattern on a circuit board or a conductive layer of an electrode. In this case, the circuit pattern or conductive layer has been formed by applying the conductive paste onto a substrate by, for example, screen printing. Japanese Laid-Open Patent Publication No. 2013-140991 discloses a composition that contains metal nanoparticles, an organic polymer and a dispersion medium. The composition is used for producing an electrode of a solar cell by being applied onto a substrate, and then baked.

Also disclosed is a method for forming a circuit pattern using an ink containing metal nanoparticles. Japanese Laid-Open Patent Publication No. 2010-80095 and Japanese Laid-Open Patent Publication No. 2013-112807 disclose an electrically conductive ink that contains at least a polymer compound and metal nanoparticles. The latter publication evaluates a volume resistivity using a baked product of an applied film of the ink.

SUMMARY OF THE INVENTION

In a thin film (metal film) obtained by baking an applied film containing metal nanoparticles, electrically conductive paths are formed through contact of the metal nanoparticles with each other. In order to reliably achieve high conductivity, it is important to increase the physical contact between the metal nanoparticles by baking them together. On the other hand, Patent Literatures 1 and 2 use an organic polymer for attaching the conductive paste or ink on the substrate. The organic polymer, however, tends to aggregate in the paste or ink. The aggregated polymer particles between the metal nanoparticles, if any, will impede the formation of the conductive paths.

An object of the present invention is to provide a nanometal ink capable of forming a metal film that exhibits good adhesion to a substrate and has low resistance, and a metal film production method using the nanometal ink.

One aspect of the present invention relates to a baking-type nanometal ink, including metal nanoparticles, a polymerizable compound, a polymerization reaction initiator, a volatile liquid medium, and a dispersant.

The polymerization reaction initiator is to be activated by the action of heat and/or light, to allow polymerization of the polymerizable compound to proceed.

The dispersant includes a $C_{6-14}$ alkylamine.

Another aspect of the present invention relates to a metal film production method. The method includes steps of: applying the aforementioned nanometal ink onto a substrate, to form an applied film; and baking the applied film, to form a metal film.

According to the above aspects of the present invention, it is possible to provide a baking-type nanometal ink capable of forming a metal film that exhibits good adhesion to a substrate and has low resistance, while suppressing the contact failure between metal nanoparticles, and a metal film production method using the nanometal ink.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF PREFERRED EMBODIMENTS

Nanometal Ink

A nanometal ink according to one embodiment of the present invention contains metal nanoparticles, a polymerizable compound, a polymerization reaction initiator, and a volatile liquid medium. The polymerization reaction initiator is to be activated by the action of heat and/or light, to allow polymerization of the polymerizable compound to proceed. The nanometal ink according to the present embodiment is a baking-type nanometal ink. The baking-type nanometal ink is an ink for forming a metal film, the film being formed by baking a film of the ink applied onto the surface of a substrate or the like.

In general, a binder is contained in inks in order to attach the metal nanoparticles in the ink on a substrate, to form a metal film with good quality, and other purposes. In conventional nanometal inks, an organic polymer is used as the binder. The organic polymer, which has a long molecular chain, however, tends to aggregate in the ink. In the metal film, electrically conductive paths are formed through contact of the metal nanoparticles with each other. Therefore, if aggregates of organic polymer are present, they will impede the formation of the conductive paths, making it difficult to reduce the resistance of the metal film.

The polymerizable compound used in the present embodiment is polymerizable by the action of heat and/or light. This polymerizable compound corresponds to a polymer raw material, and its molecular chain is shorter than that of a polymer. Therefore, the polymerizable compound, unlike the conventionally used organic polymer, tends to be easily dispersed into the nanometal ink. The highly dispersed polymerizable compound is, after the formation of an applied film, polymerized by the action of the polymerization reaction initiator and converted into a polymer serving as a binder. This makes it possible to securely attach the metal nanoparticles to the substrate, as well as to suppress the aggregation of the binder. Since the formation of conductive paths between the metal nanoparticles is not impeded as described above, a metal film having low resistance can be obtained.

Metal Nanoparticles

A metal material forming the metal nanoparticles is, for example, a single metal or an alloy.

A metal element contained in the single metal or the alloy may be a typical metal element or a transition metal element. Examples of the typical metal include Zn, Al, Ga, In, Ge, Sn, Pb, Sb, and Bi. Examples of the transition metal include Ti, Zr, V, Cr, Mn, Fe, Ru, Co, Ni, Pd, Pt, Cu, Ag, and Au. The alloy preferably contains two or more kinds of these metal elements. Preferable metal elements are, for example, Al, Sn, Ti, Ni, Pt, Cu, Ag, and Au. The metal material is preferably, for example, a single metal of Cu, a single metal of Ag, a Cu alloy, or a Ag alloy. Among them, Ag or an alloy thereof is preferred.

The nanometal ink may contain two or more kinds of metal nanoparticles differing in material. For example, the nanometal ink may contain first metal nanoparticles made of Ag or an alloy thereof, and second metal nanoparticles made of a single metal or an alloy of a metal other than Ag selected from the above-exemplified metals. In this case, the proportion of the first metal nanoparticles in the whole metal nanoparticles is preferably 80 mass % or more, and may be 80 to 99 mass %, or 85 to 99 mass %.

The average particle diameter of the metal nanoparticles can be equal to or greater than 5 nm and less than 1000 nm. The average particle diameter is preferably 5 to 500 nm, and more preferably 5 to 200 nm, or 5 to 100 nm. When the average particle diameter is in the range above, the contact between the metal nanoparticles can be increased, and the metal nanoparticles can be easily fused to each other at a comparatively low temperature. This can easily increase the conductivity of the metal film formed by using the nanometal ink.

The average particle diameter as used herein is particle diameter (D50) at 50% cumulative volume in the volumetric particle size distribution. The average particle diameter (D50) can be measured by laser diffraction/scattering method using a laser diffraction particle size analyzer. Alternatively, the average particle diameter of the metal nanoparticles may be determined from a scanning electron microscope (SEM) image of an applied film of the nanometal ink, by, with respect to optionally selected a plurality of (e.g., ten) metal nanoparticles, measuring the diameter of an equivalent circle of the particle, i.e., a circle equal in area to the region encircled by the outline of the particle, and averaging the measured diameters.

The shape of the metal nanoparticles is not limited to a particular shape, and may be spherical, spheroidal, polyhedral prismatic, polyhedral pyramidal, flat (e.g., thin strip-like, scale-like, flake-like), and other similar shapes. In view of the ease of increasing the contact between the metal nanoparticles, spherical, spheroidal, flat, and other similar shapes are preferred.

The metal nanoparticles may be commercially available ones, or ones formed by vaporizing a metal material. The metal nanoparticles may be ones produced by utilizing a chemical reaction in a liquid or gas phase.

Dispersant

The nanometal ink may contain a dispersant. The dispersant suppresses the aggregation of the metal nanoparticles in the ink, making it possible to achieve the stability of the metal nanoparticles.

The dispersant may be added during preparation of the nanometal ink, but preferably, is coordinated on the surfaces of the metal nanoparticles in advance. The dispersant can be coordinated on the metal nanoparticles either by mixing together with the metal nanoparticles and heating them as needed, or by producing the metal nanoparticles using the dispersant.

An example of the dispersant is an organic compound having a polar functional group that coordinates on the metal nanoparticle, and a hydrophobic organic group. The dispersant, which is preferably removed at an appropriate stage during the metal film formation process, is preferably a low-molecular weight compound (e.g., a compound having a molecular weight of 500 or less). The polar functional group is exemplified by an amino group, and an oxygen-containing group, such as mercapto group, hydroxyl group (including phenolic hydroxyl group), carbonyl group, ester group, and carboxyl group. The dispersant may contain one kind or two or more kinds of polar functional groups.

Although depending on the kind of metal nanoparticles, the dispersant is preferably an organic amine, in view of the stability at room temperature. The organic amine may be any of a primary amine, a secondary amine, and a tertiary amine, and may be either a cyclic amine or a chain amine, but is preferably a primary amine (in particular, a primary chain amine) in view of the ease of allowing the dispersant to coordinate on the metal nanoparticles. Specifically, the organic amine is preferably an alkylamine, examples of which include hexylamine, octylamine, decylamine, dodecylamine, and myristylamine. More specifically, a $C_{6-14}$ alkylamine or a $C_{8-12}$ alkylamine is preferred in view of its high dispersion stability and the ease of removal during the metal film production process.

Amines with a small number of carbon atoms (e.g., $C_{6-10}$ alkylamines) are highly reactive, and because of this, may cause degradation in the storage stability of the nanometal ink. Even though such an amine with a small number of carbon atoms is used, excellent storage stability can be ensured by using a cycloalkene-oxide-type alicyclic epoxy resin as the polymerizable compound. On the other hand, amines with a small number of carbon atoms, because of their high reactivity, can allow polymerization to proceed under a mild condition by, for example, low-temperature baking. Preferred among them is a $C_{8-10}$ alkylamine.

The amount of the dispersant in the nanometal ink (preferably, the dispersant coordinated on the metal nanoparticles) is, for example, 0.1 to 10 parts by mass, preferably 0.5 to 5 parts by mass, relative to 100 parts by mass of the metal nanoparticles. When the amount of the dispersant is in the range above, the metal nanoparticles tend to stabilize in the ink, and the dispersant can be removed easily.

Polymerizable Compound

The polymerizable compound is a compound capable of becoming a polymer through polymerization (including cross-linking and curing) by the action of the activated polymerization reaction initiator.

The polymerizable compound preferably has two or more polymerizable groups to be involved in polymerization. In this respect, the polymerizable compound as used herein differs from typical reactive diluents. The number of the polymerizable groups that the polymerizable compound has is, for example, 2 to 6, preferably, 2 to 4.

The polymer obtained from the polymerizable compound through polymerization functions as a binder in the metal film. Therefore, in view of obtaining the polymer with good bonding property, the polymerizable compound preferably has a polar functional group. Although depending on the kind of polymerizable compound, such a functional group may be the one containing an oxygen-containing group, such as an oxy group (—O—), carbonyl group, carbonyl oxy group (—C(=O)—O—), carbonyl dioxy group (—O—C(=O)—O—), and epoxy group. In particular, the functional group is preferably an ether group so that the dispersant, which is used for stable dispersion of the metal of the nanoparticles, can be coordinated to the metal without impediment. The polymer obtained through polymerization preferably contains the aforementioned functional group or oxygen-containing group remaining therein.

The polymerizable compound may be a polymer raw material which is, for example, a precursor such as a monomer or an oligomer composed of two or more monomers bonded together. Such a polymer raw material includes, for example, a curable resin, and specifically, may be a starting material of radical polymerization or ionic polymerization (cationic polymerization or anionic polymerization). In view of the ease of dispersing the polymerizable compound in the ink, the number of repeat monomer units in the oligomer is, for example, 2 to 10, preferably, 2 to 5.

The polymerizable compound may be used singly or in combination of two or more kinds.

The curable resin may be either a light-curable resin that can be cured by the polymerization reaction initiator activated by the action of light, or a heat-curable resin that can be cured by the polymerization reaction initiator activated by the action of heat. Note that the curable resin herein does not mean a polymer compound, but means a polymer raw material or raw material mixture before it is polymerized into a polymer by the action of the polymerization reaction initiator. Application of heat to the applied film of the ink causes the metal nanoparticles to be fused to each other and the dispersant to be removed. The heat-curable resin can be cured when applying heat to the applied film. Therefore, the heat-curable resin can be advantageously used.

Examples of the curable resin include epoxy resins, acrylic resins, phenol resins, silicone resins, vinyl ester resins, vinyl ether resins, unsaturated polyester resins, diallyl phthalate resins, and urethane-based resins. These may be used singly or in combination of two or more kinds.

In view of causing little or no damage to the stability of the metal nanoparticles and the ease of curing, preferable curable resins are, for example, epoxy resins, vinyl ether resins, acrylic resins, and vinyl ester resins, among which epoxy resins and vinyl ether resins are preferred.

Non-limiting examples of the epoxy resins include bisphenol-type epoxies, phenol-novolak-type epoxies, alicyclic epoxy resins, and glycidyl-ester-type epoxies of organic carboxylic adds. Examples of the bisphenol-type epoxies include bisphenol-A-type epoxides, bisphenol-F-type epoxides, bisphenol-AD-type epoxies, and hydrogenated bisphenol-A-type epoxies. Further examples of the bisphenol-type epoxies include epoxies (i.e., diglycidyl ethers) of $C_{2-3}$ alkylene oxide adducts of bisphenols, e.g., bisphenol A, bisphenol F and bisphenol AD. These epoxy resins can be used singly or in combination of two or more kinds.

Among the epoxy resins, alicyclic epoxy resins are preferred in view of the ease of further reducing the resistance of the metal film. Examples of the alicyclic epoxy resins include cycloalkene-oxide-type alicyclic epoxy resins, polyglycidyl ethers of alicyclic polyols, and polyglycidyl esters of alicyclic polycarboxylic acids. The alicyclic epoxy resin, due to the presence of an alicyclic group (in particular, cycloalkane oxide group) therein, tends to orient within the applied film of nanometal ink, and hardly enters between the metal nanoparticles. Therefore, even when cured through polymerization, it is unlikely to occur that the cured product enters between the metal nanoparticles and inhibits the fusion of the metal nanoparticles. Thus, the conductivity of the resultant metal film can be further increased.

The cycloalkene oxide group in the cycloalkene-oxide-type alicyclic epoxy resin is preferably a $C_{5-8}$ cycloalkene oxide, such as a cyclopentene oxide, cyclohexene oxide and cyclooctene oxide, more preferably, a $C_{5-6}$ cycloalkene oxide. The alicyclic epoxy resin may be exemplified by an epoxycycloalkane, a compound of epoxycycloalkanes linked with each other, and an ester having an epoxycycloalkane skeleton. These compounds may have a substituent. Modified products of these epoxy resins, for example, modified lactones such as ε-caprolactone are also included in the alicyclic epoxy resin.

Among the cycloalkene-oxide-type alicyclic epoxy resins, the epoxycycloalkane may be exemplified by a 1,2-epoxy $C_{5-8}$ cycloalkane, such as 1,2-epoxy-4-vinylcyclohexane. The compound of epoxycycloalkanes linked with each other may be exemplified by a compound in which epoxycycloalkanes are linked directly with each other or linked by an alkylidene group or alkylene group. Examples of such a compound include a compound in which two epoxy $C_{5-8}$ cycloalkanes are linked with each other, such as 1-(3',4'-epoxycyclohexyl)-3,4-epoxycyclohexane.

Among the cycloalkene-oxide-type alicyclic epoxy resins, the ester having an epoxycycloalkane skeleton may have an epoxycycloalkane skeleton in either the alcohol component or the carboxylic acid component of the ester, or both. An ester have an epoxycycloalkane skeleton in both the alcohol component and the carboxylic acid component is, for example, an ester of a $C_{1-2}$ alkanol having an epoxy $C_{5-8}$ cycloalkyl group and an epoxy $C_{5-8}$ cycloalkane carboxylic acid, such as 3',4'-epoxycyclohexylmethyl 3,4-epoxycyclohexanecarboxylate. The ester having an epoxycycloalkane skeleton may be an ester of an aliphatic polycarboxylic acid and a $C_{1-2}$ alkanol having an epoxy $C_{5-8}$ cycloalkyl group, such as butanetetracarboxylic acid tetra(3,4-epoxycyclohexylmethyl).

Examples of the polyglycidyl ethers of alicyclic polyols include: $C_{5-8}$ cycloalkane diol diglycidyl ethers, such as cyclohexane diol diglycidyl ether; and $C_{5-8}$ cycloalkane $diC_{1-2}$ alkanol diglycidyl ethers, such as cyclohexane dimethanol diglycidyl ether. Further examples of the polyglycidyl ethers of alicyclic polyols include: diglycidyl ethers of hydrogenated bisphenols, e.g., hydrogenated bisphenol A; and diglycidyl ethers of $C_{2-3}$ alkylene oxide adducts of hydrogenated bisphenols.

Examples of the polyglycidyl esters of alicyclic polycarboxylic acids include diglycidyl esters of $C_{5-8}$ cycloalkanedicarboxylic acids, such as cyclohexanedicarboxylic acid diglycidyl ester.

The polymerizable compound of vinyl ether resin is, for example, a vinyl ether, which is preferably a polyol poly (vinyl ether). Examples of the polyol poly(vinyl ether) include alkylene glycol divinyl ethers, polyalkylene glycol divinyl ethers, divinyl ethers of diols having an alicyclic group, trimethylolpropane trivinyl ethers, and pentaerythritol tetravinyl ethers.

Examples of the alkylene glycol divinyl ethers include ethylene glycol divinyl ethers, propylene glycol divinyl ethers, trimethylene glycol divinyl ethers, and 1,4-butanediol divinyl ethers. Preferable examples of the polyalkylene glycol divinyl ethers include divinyl ethers of poly $C_{2-4}$ alkylene glycols in which the number of repeat oxy $C_{2-4}$ alkylene units is 2 to 4, such as diethylene glycol divinyl ether and triethylene glycol divinyl ether (TEGDVE). Preferable examples of the divinyl ethers of diols having an alicyclic group include $C_{5-8}$ cycloalkane diol divinyl ethers such as cyclohexane diol divinyl ether, and $C_{5-8}$ cycloalkane $diC_{1-2}$ alkanol divinyl ethers such as cyclohexane dimethanol divinyl ether.

The polymerizable compound of acrylic resin is, for example, a (meth)acrylic acid ester, which is exemplified by a di(meth)acrylic acid ester of alkylene glycol, such as di(meth)acrylic acid ester of ethylene glycol. Acrylic acid esters and methacrylic acid esters are collectively referred to as (meth)acrylic acid esters. The polymerizable compound of vinyl ester resin is, for example, a carboxylic acid vinyl ester, which is exemplified by a divinyl ester of dicarboxylic acid, such as succinic acid divinyl ester and phthalic acid divinyl ester.

In view of the ease of increasing the conductivity of the metal film, the polymerizable compound may have no ester bond (in particular, chain ester bond).

In view of causing little or no damage to the stability of the metal nanoparticles and the ease of curing, the polymerizable compound is preferably at least one selected from the group consisting of cycloalkene-oxide-type alicyclic epoxy resins (or epoxy compounds) and vinyl ether compounds. These resins may be combined with other curable resins (curable resins other than these resins in the above exemplified curable resins). The curable resins other than these resins are preferably, for example, epoxy resins (except cycloalkene-oxide-type alicyclic epoxy resins), acrylic resins, and vinyl ester resins. The amount (total amount) of the cycloalkene-oxide-type alicyclic epoxy resin and the vinyl ester resin in the whole polymerizable compound is, for example, 70 mass % or more, and may be 80 mass % or more, or 90 mass % or more.

The polymerizable compound has a surface free energy of, for example, 42 mJ/m$^2$ or less, preferably 20 to 40 mJ/m$^2$. When the surface free energy is in the range above, although the reason is not yet clear, the baking of the metal nanoparticles proceeds quickly, and the conductivity of the metal film can be increased easily.

Polymerizable Reaction Initiator

The polymerization reaction initiator is to be activated by the action of heat and/or light, to allow the polymerization of the polymerizable compound to proceed. The polymerization reaction initiator is, for example, the one that generates a base (or anion) or an acid (or cation), or the one that generates a radical, by the action of heat and/or light. The polymerization reaction initiator may be other curing agents used for heat-curable resin, light-curable resin, and other curable resins. The nanometal ink may contain one kind or two or more kinds of polymerization reaction initiators, if necessary.

The polymerization reaction initiator that can be used is dependent on the kind of polymerizable compound. For example, any known radical polymerization initiator or ion polymerization initiator can be used. Examples of the radical polymerization initiator include peroxides, persulfates, and azobisisobutyronitriles.

As a base generator that generates a base (or anion), for example, a nonion-type base generator or ion-type base generator can be used. The nonion-type base generator can generate a primary amine, a secondary amine, an imidazole, and the like. The ion-type base generator can generate an organic strong base, such as tertiary amine, amidine, and guanidine.

As an acid generator that generates an acid, for example, a sulfonium-salt-based, iodonium-salt-based, or non-ion-based acid generator can be used. Preferred among them are sulfonium-salt-based and iodonium-salt-based acid generators that generate a cation (i.e., cation generator).

As other curing agents, for example, any known curing agent can be used depending on the kind of polymerizable compound, but the aforementioned base generator and acid generator, and a latent curing agent can be preferably used. The latent curing agent can be selected as appropriate, depending on the kind of polymerizable compound. Examples of the latent curing agent include boron trifluoride-amine complexes, dicyandiamides, organic acid hydrazides, and latent imidazoles.

In view of the ease of providing the nanometal ink with a long pot life and maintaining the high conductivity of the metal film over a long period of time, the polymerization reaction initiator is preferably the one that generates a cation (i.e., cation generator) by the action of heat and/or light. The cation generator is preferably neutral in an inactive state. The inactive state refers to a state before heat and/or light acts on the polymerization reaction initiator. The polymerization reaction initiator is preferably neutral in the inactive state in, for example, the environment of room temperature (e.g., 20 to 35° C.) or the stage before irradiated with light for activation. Note that neutral herein includes a state where acid and basic components are present in a salt-like form. A preferable neutral cation generator is the one which, when dissolved or dispersed in water, shows a pH of 5 to 9.

An example of such a cation generator is, for example, a cation generator with its counter ion being, in particular, an anion such as tetrakis(pentafluorophenyl)borate anion and an anion containing no fluorine atom. Specific examples of the cation generator include K-PURE (registered trademark) TAG and CXC series available from KING INDUSTRIES INC., photo acid generators available from San-Apro Ltd., cationic photo polymerization initiators available from ADEKA Corporation, and photo acid generators WPAG series available from Wako Pure Chemical Industries, Ltd.

The total amount of the polymerization reaction initiator and the polymerizable compound is, for example, 3 to 50 parts by mass, preferably 5 to 45 parts by mass, more preferably 10 to 40 parts by mass, relative to 100 parts by mass of the metal nanoparticles. When the total amount of the polymerization reaction initiator and the polymerizable compound is in the range above, the conductivity and the adhesion to substrates of the resultant metal film can be easily well balanced.

Liquid Medium

Examples of the liquid medium contained in the nanometal ink include alkanols, ethers, esters, ketones, and hydrocarbons. These liquid mediums may be used singly or in combination of two or more kinds.

Examples of the alkanols include $C_{1-6}$ alkanols such as methanol and ethanol.

Examples of the ethers include aliphatic ethers such as diethyl ether, and cyclic ethers such as tetrahydrofuran.

Examples of the esters include aliphatic esters, which are, for example, alkyl esters of $C_{1-4}$ carboxylic acids (e.g., $C_{1-4}$ alkyl esters or $C_{1-2}$ alkyl esters), such as ethyl acetate, butyl acetate and ethyl butyrate.

Examples of the ketones include aliphatic ketones (e.g., aliphatic ketones having a carbon number of 3 to 6), such as acetone and ethyl methyl ketone, and alicyclic ketones (e.g., $C_{5-6}$ cycloalkanones) such as cyclohexanone.

Examples of the hydrocarbons include $C_{6-10}$ alkanes such as hexane, $C_{5-8}$ cycloalkanes such as cyclohexane, benzenes, and toluenes.

When an amine having a small number of carbon atoms such as a $C_{6-10}$ alkylamine is used as a dispersant, amines are likely to be liberated. Liberated free amines may possibly react with esters or ketones. To avoid this, it is preferable to use the liquid medium other than esters and ketones.

The liquid medium, which is to be removed from the applied film in the process of forming a metal film, needs to be volatile. When considering the storing of the nanometal ink, however, the liquid medium is preferably liquid at room temperature. In view of the above, the boiling point of the liquid medium is preferably 40 to 250° C., more preferably 100 to 200° C.

The amount of the liquid medium in the nanometal ink is preferably 25 to 95 mass %, and may be 25 to 90 mass %. When the amount of the liquid medium in the range above, the components constituting the nanometal ink can be well dispersed, resulting in excellent application workability of the nanometal ink, which makes the nanometal ink applicable in inkjet printing system and the like.

Polyether Compound

The nanometal ink may contain a polyether compound having a polyoxyalkylene unit. In this case, the metal film can reliably exhibit good adhesion. In particular, the metal film tends to become rigid when the polymerizable compound is a cycloalkene-oxide-type alicyclic epoxy resin. Even in the case of using such a polymerizable compound, by using the polyether compound, the metal film can reliably exhibit good adhesion.

The polyoxyalkylene unit is preferably a poly(oxy $C_{2-4}$ alkylene)unit, such as a polyoxyethylene unit, polyoxypropylene unit, polyoxytrimethylene unit and polyoxytetramethylene unit. The polyether compound may contain one kind or two or more kinds of these polyoxyalkylene units.

The polyether compound may be a homopolymer, such as polyethylene glycol (PEG), polypropylene glycol (PPG), polytrimethylene glycol and polytetramethylene glycol (PTMG). The polyether compound may be a copolymer containing a polyoxyalkylene unit. The copolymer preferably contains two or more kinds of polyoxyalkylene units. Examples of such a copolymer include ethylene glycol-propylene glycol copolymer, tetramethylene glycol-ethylene glycol copolymer, and tetramethylene glycol-propylene glycol copolymer.

Preferred among them is a polyether compound containing at least a polyoxytetramethylene unit. Examples of such a polyether compound include PTMG, and copolymers of tetramethylene glycol and $C_{2-3}$ alkylene glycol, such as tetramethylene glycol-ethylene glycol copolymer and tetramethylene glycol-propylene glycol copolymer.

The number-average molecular weight of the polyether compound can be selected from the range of 500 to 7000, and is preferably 1000 to 5000, more preferably 1000 to 3000. When the number-average molecular weight is in the range above, the metal film can reliably exhibit good adhesion, while maintaining its low resistance.

Others

The nanometal ink may contain any known additive, if necessary. For example, the nanometal ink may contain a curing accelerator and/or a reactive diluent, depending on the kind of polymerizable compound. The amount of the additive in the nanometal ink is preferably, for example, 10 parts by mass or less, or 5 parts by mass or less, relative to 100 parts by mass of the polymerization reaction initiator and the polymerizable compound.

The nanometal ink preferably has a viscosity at room temperature (25° C.) of, for example, 2 to 10,000 mPa·s, and when used in inkjet printing system, preferably 4 to 100 mPa·s.

The nanometal ink can be obtained by mixing the metal nanoparticles, polymerization reaction initiator, polymerizable compound, liquid medium, and if necessary, dispersant. To more uniformly disperse these components, mixing may be performed using a known stirrer or mixer.

The components can be mixed in any sequence. For example, after mixing some components in advance, the remaining components may be added thereto and further mixed together. Each component may be added all together or separately. The metal nanoparticles are solid, and therefore, they are preferably dispersed in the liquid medium in advance. For example, to a dispersion containing the metal nanoparticles dispersed in advance in the liquid medium, the polymerization reaction initiator and the polymerizable compound may be added and mixed together, thereby the nanometal ink can be prepared. When using a dispersant, for example, the metal nanoparticles with the dispersant coordinated thereon in advance may be dispersed in the liquid medium to prepare a dispersion, to which the polymerization reaction initiator and the polymerizable compound can be added and mixed together.

Metal Film Production

A metal film production method according to one embodiment of the present invention includes steps of: applying the above-described nanometal ink onto a substrate, to form an applied film; and baking the applied film, to form a metal film.

In the applied-film-forming step, the nanometal ink is applied onto the surface of a substrate. The method of applying the nanometal ink is not particularly limited, and any known method, for example, spin coating, spray coating, blade coating, screen printing, or inkjet printing can be used. The applied film is not limited to a sheet-like film, and may be a pattern film for circuit wiring, filled-in holes, or the like.

The substrate may be made of any material, for example, glass, silicon, and plastic.

Prior to the baking step, the substrate with the applied film obtained in the applied-film-forming step may be dried, if necessary. The drying conditions can be determined as appropriate, depending on the components of the nanometal ink. The volatile liquid medium is preferably removed in the drying process.

The drying temperature is not particularly limited, and may be set so that the liquid medium can be removed. The drying temperature is desirably lower than the below-mentioned baking temperature.

In the baking step, the substrate having the applied film obtained in the applied-film-forming step is baked. The baking fuses the metal nanoparticles in the applied film to each other, which can significantly reduce the resistance of the resultant metal film. The metal nanoparticles, due to its nano-size effect, are fused at a temperature lower than the melting point of the metal. Therefore, even though the baking temperature is comparatively low, the resistance of the metal film can be sufficiently effectively reduced.

The baking temperature can be selected as appropriate, depending on the kind of metal nanoparticles, and may be, for example, 50 to 250° C., or 100 to 250° C., or 150 to 250° C. By using an amine having a small number of carbon atoms as the dispersant, the metal film can be formed under mild temperature conditions. In this case, the baking temperature is preferably 150° C. or lower (e.g., 50 to 150° C.), and may be 100 to 150° C.

The baking may be performed in the presence of a reducing agent, if necessary.

The baking may be performed in an inert gas atmosphere or in air.

The baking duration is, for example, 5 to 120 minutes, but not limited thereto.

When the polymerization reaction initiator becomes active by the action of heat, the initiator may be activated by the heat of drying and/or baking, so that polymerization of the polymerizable compound is allowed to proceed. In short, in the drying step and/or the baking step, the polymerizable compound is polymerized and converted into a polymer serving as a binder.

When the polymerization reaction initiator becomes active by the action of light, it is preferable to irradiate the applied film with light at an appropriate stage between the applied-film-forming step and the baking step. Alternatively, the drying step and/or the baking step may be performed under irradiation with light. The wavelength and amount of light to be irradiated can be determined as appropriate, depending on the kind of polymerization reaction initiator. By exposing the applied film to light at an appropriate stage in that way, the polymerization of the polymerizable compound proceeds, converting the polymerizable compound into a polymer serving as a binder.

In that way, the resultant metal film includes a polymer binder produced from the polymerizable compound through polymerization, and this ensures good adhesion between the substrate and the metal film.

EXAMPLES

The present invention will now be specifically described by way of Examples and Comparative Examples. The following Examples, however, are not to be construed as limiting in any way the scope of the present invention.

Example 1

(1) Formation of Ag Nanoparticles

First, 20 g of silver nitrate, 100 g of isobutanol, and 100 g of dispersant (dodecylamine) were mixed together. The mixture was heated until its temperature reached 100° C., and held at reflux for 5 hours. The resultant mixture was subjected to centrifugal separation, and the solid precipitate therein was collected. The collected solid was washed with methanol three times, and thereafter, subjected to centrifugal separation, thereby to collect Ag nanoparticles with dodecylamine coordinated thereon. The collected Ag nanoparticles were dispersed into cyclohexanone using an ultrasonic homogenizer, thereby to prepare a dispersion. The mass ratio of the Ag nanoparticles to the dodecylamine coordinated on the Ag nanoparticles was 100:3. The mass ratio of the Ag nanoparticles (Ag nanoparticles with dodecylamine coordinated thereon) to the cyclohexanone was 100:200.

The obtained dispersion was applied onto a substrate by spin coating, and a SEM image of the Ag nanoparticles was taken. The average particle diameter of the Ag nanoparticles calculated and determined from the SEM image in the aforementioned manner was 40 nm.

(2) Preparation of Nanometal Ink

To the dispersion obtained in (1) above, while being stirred with a stirrer, a bisphenol-F-type epoxy compound (RE-304S available from Nippon Kayaku Co., Ltd.) (e1) serving as the polymerizable compound, and a heat cation generator (CXC-1821 available from KING INDUSTRIES INC.) (c1) serving as the polymerization reaction initiator were added and mixed together. The amounts of the polymerizable compound (e1) and the polymerization reaction initiator (c1) added here were 2 parts by mass and 0.02 parts by mass, respectively, relative to 100 parts by mass of the Ag nanoparticles (Ag nanoparticles with dodecylamine coordinated thereon). The obtained mixture was filtered through a membrane filter having an opening diameter of 3 μm, to collect a filtrate as a nanometal ink.

(3) Evaluation (a) Application Workability

The nanometal ink obtained in (2) above was applied onto a silicon substrate of 5 inches (≈12.7 cm) square by using a spin coater, with the coater rotation speed adjusted to give a film thickness of 0.5 μm. The condition of a film of the nanometal ink thus applied was visually inspected. When unevenness was observed on the applied film on the substrate, it was evaluated as B; and when the applied film was formed in good condition without unevenness, it was evaluated as A.

(b) Volume Resistance of Metal Film

The nanometal ink obtained in (2) above was applied onto a silicon substrate of 5 inches (≈12.7 cm) square by using a spin coater, with the coater rotation speed adjusted to give a film thickness of 0.5 μm. The substrate with the applied film was placed on a hotplate to heat the substrate to a temperature of 120° C., thereby to dry the applied film. This was followed by baking by heating for 30 minutes so that the substrate temperature was raised to 180° C. In that way, a substrate having a metal film was produced. The volume resistance (μΩ·cm) of the metal film at the initial stage was measured by a four-terminal method using a resistivity meter (Loresta-GP available from Mitsubishi Chemical Analytech Co., Ltd.).

In addition, the volume resistance of the metal film after left to stand at room temperature for two weeks was measured in a similar manner to the above.

(c) Fusing of Ag Particles

After the initial volume resistance was measured in (b) above, the metal film was broken together with the substrate, and the cross section of the metal film was observed under SEM. When the Ag nanoparticles were completely fused together without maintaining the shape as observed at the time of measuring their average particle diameter (at the initial stage), it was evaluated as A; and when the Ag nanoparticles were partially fused together, it was evaluated as B.

(d) Adhesion to Substrate

A metal film was formed on the substrate in a similar manner to (b) above. The metal film was provided with cuts in a grid pattern with a grid width of 1 mm. An adhesive tape was attached on the film and then peeled off. The peeling of the metal film during the peeling of the adhesive tape was visually inspected. When the metal film was not peeled at all, it was evaluated as A; when peeled partially, it was evaluated as B; and when peeled completely, it was evaluated as C.

Examples 2 to 10

A nanometal ink was prepared and evaluated in a similar manner to Example 1, except for using the polymerizable compounds and the polymerization reaction initiators as shown in Table 1, each in an amount as shown in Table 1.

The polymerizable compounds and the polymerization reaction initiators used here are shown below.

Polymerizable Compound:
(e1): Bisphenol-F-type epoxy compound (RE-304S, Nippon Kayaku Co., Ltd.)
(e2): Alicyclic epoxy compound (CELLOXIDE 2021P, available from Daicel Corporation)
(e3): Alicyclic epoxy compound (CELLOXIDE 2081, available from Daicel Corporation)
(e4): Alicyclic epoxy compound (CELLOXIDE 8000, available from Daicel Corporation)

(e5): Diglycidyl ether of propylene oxide adduct of bisphenol A (EP-4000L, available from ADEKA Corporation)
(e6): TEGDVE (available from NIPPON CARBIDE INDUSTRIES CO., INC.)

Polymerization Reaction Initiator:
(c1): Heat cation generator (CXC-1821, available from KING INDUSTRIES INC.)
(c2): 1-cyanoethyl-2-ethyl-4-methyl imidazole (2E4MZ-CN, available from SHIKOKU CHEMICALS CORPORATION)
(c3): Latent imidazole (Fujicure 7000, available from T&K TOKA Corporation)

Examples 11 to 14

A nanometal ink was prepared and evaluated in a similar manner to Example 8, except for using the polymerizable compounds and the polymerization reaction initiators as shown in Table 1, each in an amount as shown in Table 1, and using the liquid medium in an amount as shown in Table 1.

Comparative Example 1

A nanometal ink was prepared and evaluated in a similar manner to Example 1, except for using neither the polymerizable compound nor the polymerization reaction initiator.

Comparative Example 2

A nanometal ink was prepared and evaluated in a similar manner to Example 1, except for using neither the polymerizable compound nor the polymerization reaction initiator, and using polyester resin (VYLON 500, available from TOYOBO CO., LTD.) (p1) in an amount of 5 parts by mass, relative to 100 parts by mass of the Ag nanoparticles.

Comparative Example 3

A nanometal ink was prepared and evaluated in a similar manner to Example 1, except for using neither the polymerizable compound nor the polymerization reaction initiator, and using phenoxy resin (JER 1256, available from Mitsubishi Chemical Corporation) (p2) in an amount of 5 parts by mass, relative to 100 parts by mass of the Ag nanoparticles.

The evaluation results are shown in Table 1, along with the compositions of the nanometal inks of Examples 1 to 14 and Comparative Examples 1 to 3. A1 to A14 correspond to Examples 1 to 14, respectively, and B1 to B3 correspond to Comparative Examples 1 to 3, respectively. The amount of Ag nanoparticles in Table 1 includes the amount of dodecylamine used as the dispersant.

TABLE 1

| | A1 | A2 | A3 | A4 | A5 | A6 | A7 | A8 | A9 | A10 | A11 | A12 | A13 | A14 | B1 | B2 | B3 |
|---|---|---|---|---|---|---|---|---|---|---|---|---|---|---|---|---|---|
| Ag nanoparticles (parts by mass) | 100 | 100 | 100 | 100 | 100 | 100 | 100 | 100 | 100 | 100 | 100 | 100 | 100 | 100 | 100 | 100 | 100 |
| Dispersant | | | | | | | | Dodecylamine | | | | | | | | | |
| Liquid medium (parts by mass) | 200 | 200 | 200 | 200 | 200 | 200 | 200 | 200 | 200 | 200 | 50 | 900 | 200 | 200 | 200 | 200 | 200 |
| Polymerizable compound (parts by mass) | e1 2 | e1 5 | e1 10 | e1 20 | e1 45 | e2 5 | e3 5 | e4 5 | e5 5 | e6 5 | e4 20 | e4 20 | e4 20 | e4 20 | | | |
| Polymerization reaction initiator (parts by mass) | c1 0.02 | c1 0.03 | c1 0.1 | c1 0.2 | c1 0.4 | c1 0.05 | c1 0.05 | c1 0.05 | c1 0.05 | c1 0.05 | c1 0.2 | c1 0.2 | c2 0.2 | c3 5 | | | |
| Organic polymer (parts by mass) | | | | | | | | | | | | | | | | p1 5 | p2 5 |
| Application workability | A | A | A | A | A | A | A | A | A | A | A | A | A | A | A | A | A |
| Initial volume resistance ($\mu\Omega \cdot cm$) | 4 | 4 | 5 | 8 | 20 | 6 | 4 | 3 | 8 | 4 | 5 | 5 | 6 | 34 | 3 | 3122 | 898 |

TABLE 1-continued

|  | A1 | A2 | A3 | A4 | A5 | A6 | A7 | A8 | A9 | A10 | A11 | A12 | A13 | A14 | B1 | B2 | B3 |
|---|---|---|---|---|---|---|---|---|---|---|---|---|---|---|---|---|---|
| Fused condition of Ag nanoparticles | A | A | A | A | A | A | A | A | A | A | A | A | A | A | A | B | B |
| Adhesion | B | A | A | A | A | A | A | A | B | A | A | A | A | A | C | A | A |

(e1): Bisphenol-F-type epoxy compound (RE-304S, Nippon Kayaku Co., Ltd.)
(e2): Alicyclic epoxy compound (CELLOXIDE 2021P, available from Daicel Corporation)
(e3): Alicyclic epoxy compound (CELLOXIDE 2081, available from Daicel Corporation)
(e4): Alicyclic epoxy compound (CELLOXIDE 8000, available from Daicel Corporation)
(e5): Diglycidyl ether of propylene oxide adduct of bisphenol A (EP-4000L, available from ADEKA Corporation)
(e6): TEGDVE (available from NIPPON CARBIDE INDUSTRIES CO., INC.)
(c1): Heat cation generator (CXC-1821, available from KING INDUSTRIES INC.)
(c2): 1-cyanoethyl-2-ethyl-4-methyl imidazole (2E4MZ-CN, available from SHIKOKU CHEMICALS CORPORATION)
(c3): Latent imidazole (Fujicure 7000, available from T&K TOKA Corporation)
(p1): Polyester resin (VYLON 500, available from TOYOBO CO., LTD.)
(p2): Phenoxy resin (JER 1256, available from Mitsubishi Chemical Corporation)

As shown in Table 1, in Examples, the metal film exhibited good adhesion to the substrate, the Ag nanoparticles were satisfactorily fused to each other, and the initial volume resistance was low. Furthermore, in Examples, the application workability of the nanometal ink was excellent, resulting in an applied film formed in good condition. In contrast, in B1 without the binder, although the initial volume resistance was low, the metal film was completely peeled off by the adhesive tape, failing to achieve sufficient adhesion to the substrate. In Comparative Examples B2 and B3 using the nanometal ink with an organic polymer blended therein, only part of the Ag nanoparticles were fused to each other, resulting in an extremely high initial volume resistance.

In A1 to A12 and B1, even after left to stand for two weeks, the volume resistance was suppressed as low as the initial volume resistance. On the other hand, A13, A14, B2 and B3, after left to stand for two weeks, the electrical conductivity was lost. In view of suppressing the over-time increase of the resistance of the metal film, it is preferable to use a neutral cation generator such as (c1).

Example 15

(1) Formation of Ag Nanoparticles

First, 500 mL of water was poured into a 1-L eggplant flask, then 10 g of dispersant (octylamine) and 1 g of hydrazine hydrate (reducing agent) were added thereto, and mixed together under stirring in a nitrogen atmosphere. To the resultant mixture, an aqueous solution of 7 g of silver nitrate dissolved in 60 g of water was added under stirring, and then stirred for 5 minutes. The resultant dispersion was allowed to stand still. Thereafter, the supernatant liquid was removed. To the remaining precipitate solid, cyclohexanol acetate was added and dispersed using a homogenizer. The upper layer thus separated, i.e., an organic phase (dispersion) in which Ag nanoparticles with octylamine coordinated thereon were dispersed, was collected. The collected dispersion was observed under SEM. The diameters of the particles were 30 to 50 nm.

(2) Preparation of Nanometal Ink

Limonene oxide (LDO) (e7) as the polymerizable compound, the polymerization reaction initiator (c1) and a polyether compound (PTMG (d6) having a number-average molecular weight Mn of 2000) were dissolved in cyclohexanol acetate. The resultant solution was added to the dispersion obtained in (1) above, and mixed together. The amounts of the polymerizable compound (e7), the polymerization reaction initiator (c1), and the polyether compound (d6) used here were 5 parts by mass, 0.1 parts by mass, and 0.5 parts by mass, respectively, relative to 100 parts by mass of the Ag nanoparticles (Ag nanoparticles with octylamine coordinated thereon). The obtained mixture was filtered through a glass filter having an opening diameter of 1 μm, to collect a filtrate as a nanometal ink.

(3) Evaluation (a) Application Workability

The application workability of the nanometal ink obtained in (2) above was evaluated in a similar manner to Example 1.

(b) Volume Resistance of Metal Film

The nanometal ink obtained in (2) above was applied onto a disc-shaped silicon substrate of 5 inches (=12.7 cm) in diameter by using a spin coater, with the coater rotation speed adjusted to give a film thickness of 0.5 μm. The substrate with the applied film was placed on a hotplate to heat the substrate to a temperature of 120° C., thereby baking was performed. The initial volume resistance $R_i$ (μΩ·cm) of the baked film on the substrate was measured by a four-terminal method metal using a resistivity meter (Loresta-GP available from Mitsubishi Chemical Analytech Co., Ltd.).

In addition, the initial volume resistance in the case where the baking temperature was 180° C. was measured in a similar manner to the above.

(c) Adhesion to Substrate

A baked film was formed on the substrate with the baking temperature set at 120° C., in a similar manner to (b) above. The baked film was provided with cuts in a grid pattern with a grid width of 1 mm. An adhesive tape was attached on the film and then peeled off. The peeling of the baked film during the peeling of the adhesive tape was visually inspected. When the baked film was not peeled at all, it was evaluated as A; when peeled partially, it was evaluated as B; and when peeled completely, it was evaluated as C.

(d) Storage Stability

The nanometal ink obtained in (2) above was left to stand in a 23° C. thermostatic chamber for one month. A baked film was formed on the substrate at 120° C. in a similar manner to (b) above, except for using the nanometal ink having left to stand for one month, and the volume resistance $R_s$ of the baked film was measured. The ratio of the volume resistance $R_s$ to the initial volume resistance $R_i$ was evaluated according to the following criteria.

A: $R_s \leq 2R_i$
B: $2R_i < R_s \leq 10R_i$
C: $10R_i < R_s$

Examples 16 to 17

The amount of polyether compound as used in (2) in Example 15 was changed as shown in Table 2. In a similar manner to Example 15 except the above, a nanometal ink was prepared and evaluated.

Examples 18 to 26

A nanometal ink was prepared and evaluated in a similar manner to Example 16, except for using the polymerizable compounds as shown in Table 2, each in an amount as shown in Table 2.

The polymerizable compounds used here are shown below. As for (e1), (e4) and (e7), the aforementioned ones were used.

Comparative Example 4

A dispersion was prepared in a similar manner to Example 16, except for using pentylamine as the dispersant in place of the octylamine. A nanometal ink was prepared and evaluated in a similar manner to Example 16, except for using the obtained dispersion.

Comparative Example 5

A dispersion was prepared in a similar manner to Example 16, except for using oleylamine as the dispersant in place of the octylamine. A nanometal ink was prepared and evaluated in a similar manner to Example 16, except for using the obtained dispersion.

The evaluation results are shown in Table 2, along with the compositions of the nanometal inks of Examples 15 to 26 and Comparative Examples 4 to 5. A15 to A26 correspond to Examples 15 to 26, respectively, and B4 and B5 correspond to Comparative Examples 4 and 5, respectively. The amount of Ag nanoparticles in Table 2 includes the amount of amine used as the dispersant.

TABLE 2

| | A15 | A16 | A17 | A18 | A19 | A20 | A21 | A22 | A23 | A24 | A25 | A26 | B4 | B5 |
|---|---|---|---|---|---|---|---|---|---|---|---|---|---|---|
| Ag nanoparticles (parts by mass) | 100 | 100 | 100 | 100 | 100 | 100 | 100 | 100 | 100 | 100 | 100 | 100 | 100 | 100 |
| Dispersant | | | | | | Octylamine | | | | | | | Pentylamine | Oleylamine |
| Liquid medium (parts by mass) | 100 | 100 | 100 | 100 | 100 | 100 | 100 | 100 | 100 | 100 | 100 | 100 | 100 | 100 |
| Polymerizable compound | e7 | e7 | e7 | e4 | e8 | e9 | e10 | e11 | e12 | e13 | e1 | e14 | e7 | e7 |
| (parts by mass) | 5 | 5 | 5 | 5 | 5 | 5 | 5 | 5 | 5 | 5 | 5 | 5 | 5 | 5 |
| Polymerization reaction initiator | c1 | c1 | c1 | c1 | c1 | c1 | c1 | c1 | c1 | c1 | c1 | c1 | c1 | c1 |
| (parts by mass) | 0.1 | 0.1 | 0.1 | 0.1 | 0.1 | 0.1 | 0.1 | 0.1 | 0.1 | 0.1 | 0.1 | 0.1 | 0.1 | 0.1 |
| Polyether compound | d6 | d6 | d6 | d6 | d6 | d6 | d6 | d6 | d6 | d6 | d6 | d6 | d6 | d6 |
| (parts by mass) | 0.5 | 1 | 2 | 1 | 1 | 1 | 1 | 1 | 1 | 1 | 1 | 1 | 1 | 1 |
| Application workability | A | A | A | A | A | A | A | A | A | A | A | A | B | A |
| Storage stability | A | A | A | A | A | A | A | A | A | A | C | C | B | A |
| When baked at 120° C. | | | | | | | | | | | | | | |
| Adhesion | B | A | A | A | A | A | A | A | A | A | A | A | — | A |
| Volume resistance (μΩ · cm) | 7 | 16 | 33 | 23 | 11 | 19 | 16 | 12 | 13 | 15 | 216 | — | — | over |
| When baked at 180° C. | | | | | | | | | | | | | | |
| Volume resistance (μΩ · cm) | | | | | | | | | | | 7 | 11 | — | 354 |

(e1): Bisphenol-F-type epoxy compound (RE-304S, Nippon Kayaku Co., Ltd.)
(e4): Alicyclic epoxy compound (CELLOXIDE 8000, available from Daicel Corporation)
(e7): Limonene oxide
(e8): 1,2,5,6-diepoxy cyclooctane
(e9): 4,5,8,9-diepoxy tricyclodecane
(e10): 2-(7-oxabicyclo[4.1.0]heptane-3-yl)oxirane
(e11): Alicyclic epoxy compound (CELLOXIDE 2000, available from Daicel Corporation)
(e12): Pinene oxide
(e13): Limonene oxide
(e14): Bisphenol-A-type epoxy compound (jER ® 828, available from Mitsubishi Chemical Corporation)
(c1): Heat cation generator (CXC-1821, available from KING INDUSTRIES INC.)
(d6): PTMG with Mn 2000

As shown in Table 2, in Comparative Example 4 using pentylamine, the applied film had unevenness, and the evaluation on the adhesion was impossible. In Comparative Example 5 using oleylamine, the volume resistance was over the measurement limit, failing to obtain electrical conductivity. In contrast, in Examples, the metal film exhibited good adhesion to the substrate, and the initial volume resistance was low. Furthermore, in Examples, the application workability of the nanometal ink was excellent, resulting in an applied film formed in good condition. Examples 15 to 24 were excellent in storage stability.

Examples 27 to 41

A nanometal ink was prepared and evaluated in a similar manner to Example 16, except for using the polyether compounds as shown in Table 3. The evaluation on the volume resistance was performed only when baked at 120° C. The polyether compounds used here are shown below.
- (d1): PTMG (PTMG 850, number-average molecular weight: 850, available from Mitsubishi Chemical Corporation)
- (d2): PTMG (PTMG 1000, number-average molecular weight: 1000, available from Mitsubishi Chemical Corporation)
- (d3): PTMG (PTMG 1300, number-average molecular weight: 1300, available from Mitsubishi Chemical Corporation)
- (d4): PTMG (PTMG 1500, number-average molecular weight: 1500, available from Mitsubishi Chemical Corporation)
- (d5): PTMG (PTMG 1800, number-average molecular weight: 1800, available from Mitsubishi Chemical Corporation)
- (d7): PTMG (PTMG 3000, number-average molecular weight: 3000, available from Mitsubishi Chemical Corporation)
- (d8): PEG (PEG #1000, number-average molecular weight: 1000, available from NOF CORPORATION)
- (d9): PPG (PP-1000, number-average molecular weight: 1000, available from SANYO KASEI Co., Ltd.)
- (d10): PPG (PP-2000, number-average molecular weight: 2000, available from SANYO KASEI Co., Ltd.)
- (d11): PPG (PP-3000, number-average molecular weight: 3200, available from SANYO KASEI Co., Ltd.)
- (d12): PPG (PP-4000, number-average molecular weight: 4150, available from SANYO KASEI Co., Ltd.)
- (d13): Tetramethylene glycol-ethylene glycol copolymer (DC-1100, number-average molecular weight: 1000, available from NOF CORPORATION)
- (d14): Tetramethylene glycol-ethylene glycol copolymer (DC-1800E, number-average molecular weight: 1800, available from NOF CORPORATION)
- (d15): Tetramethylene glycol-ethylene glycol copolymer (DC-3000E, number-average molecular weight: 3000, available from NOF CORPORATION)
- (d16): Tetramethylene glycol-propylene glycol copolymer (DCB-2000, number-average molecular weight: 2000, available from NOF CORPORATION)

The evaluation results are shown in Table 3, along with the compositions of the nanometal inks of Examples 27 to 41. A27 to A41 correspond to Examples 27 to 41, respectively. The amount of Ag nanoparticles in Table 3 includes the amount of amine used as the dispersant.

TABLE 3

|  | A27 | A28 | A29 | A30 | A31 | A32 | A33 | A34 | A35 | A36 | A37 | A38 | A39 | A40 | A41 |
| --- | --- | --- | --- | --- | --- | --- | --- | --- | --- | --- | --- | --- | --- | --- | --- |
| Ag nanoparticles (parts by mass) | 100 | 100 | 100 | 100 | 100 | 100 | 100 | 100 | 100 | 100 | 100 | 100 | 100 | 100 | 100 |
| Dispersant | | | | | | | | Octylamine | | | | | | | |
| Liquid medium (parts by mass) | 100 | 100 | 100 | 100 | 100 | 100 | 100 | 100 | 100 | 100 | 100 | 100 | 100 | 100 | 100 |
| Polymerizable compound | e7 | e7 | e7 | e7 | e7 | e7 | e7 | e7 | e7 | e7 | e7 | e7 | e7 | e7 | e7 |
| (parts by mass) | 5 | 5 | 5 | 5 | 5 | 5 | 5 | 5 | 5 | 5 | 5 | 5 | 5 | 5 | 5 |
| Polymerization reaction initiator | c1 | c1 | c1 | c1 | c1 | c1 | c1 | c1 | c1 | c1 | c1 | c1 | c1 | c1 | C1 |
| (parts by mass) | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Polyether compound | d1 | d2 | d3 | d4 | d5 | d7 | d8 | d9 | d10 | d11 | d12 | d13 | d14 | d15 | d16 |
| (parts by mass) | 1 | 1 | 1 | 1 | 1 | 1 | 1 | 1 | 1 | 1 | 1 | 1 | 1 | 1 | 1 |
| Application workability | A | A | A | A | A | A | A | A | A | A | A | A | A | A | A |
| Storage stability | A | A | A | A | A | A | A | A | A | A | A | A | A | A | A |
| When baked at 120° C. | | | | | | | | | | | | | | | |
| Adhesion | A | A | A | A | A | A | A | A | A | A | A | A | A | A | A |
| Volume resistance ($\mu\Omega \cdot cm$) | 30 | 29 | 13 | 14 | 10 | 8 | 6 | 7 | 11 | 17 | 13 | 17 | 18 | 12 | 23 |

(e1): Bisphenol-F-type epoxy compound (RE-304S, Nippon Kayaku Co., Ltd.)
(c1): Heat cation generator (CXC-1821, available from KING INDUSTRIES INC.)
(d1): PTMG with Mn 850
(d2): PTMG with Mn 1000
(d3): PTMG with Mn 1300
(d4): PTMG with Mn 1500
(d5): PTMG with Mn 1800
(d7): PTMG with Mn 3000
(d8): PEG with Mn 1000
(d9): PPG with Mn 1000
(d10): PPG with Mn 2000
(d11): PPG with Mn 3200
(d12): PPG with Mn 4150
(d13): Tetramethylene glycol-ethylene glycol copolymer with Mn 1000
(d14): Tetramethylene glycol-ethylene glycol copolymer with Mn 1800
(d15): Tetramethylene glycol-ethylene glycol copolymer with Mn 3000
(d16): Tetramethylene glycol-propylene glycol copolymer with Mn 2000

As shown in Table 3, in these Examples, too, the metal film exhibited good adhesion to the substrate, and the initial volume resistance was low. Furthermore, in these Examples, the application workability of the nanometal ink was excellent, resulting in an applied film formed in good condition. Moreover, these Examples were excellent in storage stability.

The nanometal ink according to the embodiments of the present invention is capable of forming a metal film that exhibits excellent adhesion to a substrate and has low resistance, and therefore, can be usefully used for various applications utilizing a highly conductive metal film, for example, for forming a circuit pattern of a substrate such as a circuit board.

The invention claimed is:

1. A baking-type nanometal ink, comprising
   metal nanoparticles,
   a polyermizable compound,
   a polymerization reaction initiator,
   a polyether compound having a polyoxyalkylene unit,
   a volatile liquid medium, and
   a dispersant,
   the polymerization reaction initiator that is to be activated by action of heat and/or light, to allow polymerization of the polymerizable compound to proceed,
   the dispersant including a $C_{6-14}$ alkylamine,
   wherein the polyether compound contains at least a polyoxytetramethylene unit.

2. The nanometal ink of claim 1, wherein the dispersant includes a $C_{8-12}$ alkylamine.

3. The nanometal ink of claim 1, wherein the liquid medium is contained in an amount of 25 to 95 mass % in the nanometal ink.

4. The nanometal ink of claim 1, wherein a total amount of the polymerization reaction initiator and the polymerizable compound is 3 to 50 parts by mass relative to 100 parts by mass of the metal nanoparticles.

5. The nanometal ink of claim 1, wherein the polymerization reaction initiator is to be activated by action of heat and/or light, to generate a cation.

6. The nanometal ink of claim 1, wherein
   the polymerizable compound is a heat-curable resin, and
   the polymerization reaction initiator is a curing agent for curing the heat-curable resin.

7. The nanometal ink of claim 1, wherein the polymerizable compound is at least one polymerizable compound selected from the group consisting of epoxy resins and vinyl ethers.

8. The nanometal ink of claim 1, wherein the polymerizable compound is at least one polymerizable compound selected from the group consisting of alicyclic epoxy resins and vinyl ethers.

9. The nanometal ink of claim 1, wherein the polymerizable compound is at least one polymerizable compound selected from the group consisting of cycloalkene-oxide-based alicyclic epoxy resins and vinyl ethers.

10. The nanometal ink of claim 1, wherein the polyether compound has a number-average molecular weight of 1000 to 5000.

11. The nanometal ink of claim 1, wherein the metal nanoparticles have a mean particle diameter of 5 to 500 nm.

12. A metal film production method comprising the steps of:
   applying the nanometal ink of claim 1 onto a substrate, to form an applied film; and
   baking the applied film, to form a metal film.

* * * * *